United States Patent
Dai et al.

(10) Patent No.: US 9,629,080 B2
(45) Date of Patent: Apr. 18, 2017

(54) METHOD, DEVICE AND SYSTEM FOR REJECTING AUXILIARY INFORMATION ABOUT USER EQUIPMENT

(71) Applicant: ZTE CORPORATION, Shenzhen, Guangdong Province (CN)

(72) Inventors: Qian Dai, Shenzhen (CN); Lei Mao, Shenzhen (CN); Yingqi Xu, Shenzhen (CN); Yunpeng Cui, Shenzhen (CN)

(73) Assignee: ZTE CORPORATION, Shenzhen, Guangdong (CN)

( * ) Notice: Subject to any disclaimer, the term of this patent is extended or adjusted under 35 U.S.C. 154(b) by 141 days.

(21) Appl. No.: 14/398,388

(22) PCT Filed: Jun. 27, 2013

(86) PCT No.: PCT/CN2013/078210
§ 371 (c)(1),
(2) Date: Oct. 31, 2014

(87) PCT Pub. No.: WO2013/185657
PCT Pub. Date: Dec. 19, 2013

(65) Prior Publication Data
US 2015/0131506 A1    May 14, 2015

(30) Foreign Application Priority Data
Jul. 23, 2012 (CN) .......................... 2012 1 0256020

(51) Int. Cl.
*H04W 4/20* (2009.01)
*H04W 52/02* (2009.01)
*H04W 28/18* (2009.01)

(52) U.S. Cl.
CPC ......... *H04W 52/0209* (2013.01); *H04W 4/20* (2013.01); *H04W 28/18* (2013.01)

(58) Field of Classification Search
CPC .... H04W 52/0209; H04W 4/20; H04W 28/18
See application file for complete search history.

(56) References Cited

U.S. PATENT DOCUMENTS

2006/0034204 A1* 2/2006 Lee ..................... H04W 76/027
370/312
2013/0287009 A1* 10/2013 Ahn ................... H04W 72/1289
370/336
2014/0003354 A1* 1/2014 Ekici .................. H04W 76/028
370/329

FOREIGN PATENT DOCUMENTS

EP          1998531 A2    12/2008
KR  10-2012-0080478    *  7/2012  .............. H04B 7/26
WO   WO 2012/025825 A2    3/2012

* cited by examiner

*Primary Examiner* — Kwang B Yao
*Assistant Examiner* — Moo Ryong Jeong
(74) *Attorney, Agent, or Firm* — Merchant & Gould P.C.

(57) ABSTRACT

A method, apparatus and system for rejecting auxiliary information about user equipment are disclosed, which relate to the technical field of wireless communications, and solve the problem that UE retransmitting auxiliary information generates additional overheads or fails to know the reason why a network side rejects. The method includes: a network side receiving auxiliary information reported by user equipment; and if the network side determines not to reconfigure a wireless parameter for the user equipment, the network side transmitting rejection reason information to the user equipment. The above technical solution is applicable to an LTE or UMTS system, and realizes the control by UE of the transmission of auxiliary information according to a rejection mechanism.

8 Claims, 3 Drawing Sheets

FIG. 6 ns and more demands on
METHOD, DEVICE AND SYSTEM FOR REJECTING AUXILIARY INFORMATION ABOUT USER EQUIPMENT This application is a National Stage Application of PCT/CN2013/078210, filed 27 Jun. 2013, which claims benefit of Serial No. 201210256020.6, filed 23 Jul. 2012 in China and which applications are incorporated herein by reference. To the extent appropriate, a claim of priority is made to each of the above disclosed applications.

TECHNICAL FIELD

The present document relates to the field of technologies for rejecting auxiliary information about user equipment, and in particular, to a method, apparatus and system for rejecting auxiliary information about user equipment.

BACKGROUND OF THE RELATED ART

With the gradual improvement in the living standard of the people, people also have more and more demands on communications, most of which are relatively personalized needs. With the proposition and actual implementation of these demands, the design of the terminal also presents a new development trend, i.e., an intelligent terminal with a large screen.

The intelligent terminals can provide users with various services from surfing the Internet to randomly installing and uninstalling, which makes the application services of the terminal more complete and makes the users' lives richer and more colorful. However, with the widespread application of the intelligent terminals, the drawbacks thereof and the influences on the existing network side are also becoming increasingly obvious.

For the intelligent terminals per se, the power consumption thereof is large and both the standby time and use time are relatively limited; and for the network, the large-scale application of the intelligent terminals brings large signaling and resource use pressure to the network. The reason why the above phenomenon occurs is primarily that various application programs always run in the foreground and background of the operating system of the intelligent device, and these application programs transmit data to the network side or receive data from the network side irregularly.

In general, the system will configure a Discontinuous Reception (DRX) period for the terminal, and the terminal wakes at predetermined periods to receive and transmit the data, and then enters into a sleep cycle, which can have a power saving effect. If the DRX period is configured to be too short, the terminal will wake frequently, which can not play a role in power saving, and if the DRX is configured to be too long, it may also increase the delay of data. Not only the delay of data can be ensured but also the power saving performance can be achieved only when the DRX period is matched with the data arrival rule. Many applications such as QQ chart running on the intelligent terminal are not very sensitive to the delay, and therefore a more power saving configuration can be selected from two targets of the power saving and the service performance.

In addition, in order to be able to reduce the delay of data transmission so as to better ensure the user experience, after the terminal completes data transmission or reception once, the terminal may be in a Radio Resource Control Connected state for a relatively long time; however, it also increases the consumption of energy. However, if the terminal is kept to be in a connected state for a relatively short time so as to saving the energy, due to irregular transmission and reception of data, the terminal may need to frequently initiate a process of random access and RRC connection establishment; while if the terminal is in an RRC connected state for a relatively long time, it may result in excessive switching processes, which will largely increase the signaling pressure and the control resource usage pressure at the network side.

Therefore, in order to be able to keep the intelligent terminal to be in the standby and use time as long as possible while taking account of the signaling and resource usage pressure of the network, it needs to reasonably control the time length when the intelligent terminal is in the RRC connected state after completing data transmission or reception operation once, i.e., it needs to find a balance point between the both.

That the movement speed of the intelligent terminal is an importance decision factor for keeping an RRC connected state can be concluded from the related simulation and analysis. In a case that the movement speed is low, the intelligent terminal can be in the RRC connected state for a long time, and thereby the terminal can reduce the power consumption by configuring a reasonable discontinuous reception function parameter while also keeping a relatively low signaling and resource overhead (the probability that the switching occurs is low); and in a case that the movement speed is high, the intelligent terminal can be in the RRC connected state for a short time, and thereby the terminal can save the power consumption while also reducing the signaling and resource overhead (substituting the switching operation with cell reselection). Therefore, the network side needs to know the information related to the movement speed of the intelligent terminal, thereby reasonably controlling the time length when the terminal is in the RRC connected state.

At present, the 3GPP is discussing the prioritization of the intelligent terminal, and the currently determined prioritization measures are as follows.

A User Equipment (UE) may report auxiliary information, which comprises whether the UE prefers software use experience with power saving or software use experience with high performance; mobility information of the UE; the data transmission interval of the UE etc., and the network side decides how to optimize the wireless parameter of the UE according to the auxiliary information.

For example, if the UE desires more power saving in the auxiliary information, the network side may configure a longer DRX period for the terminal so as to save the power of the terminal.

However, at present, the report and feedback rule of the auxiliary information about the UE is not defined by the 3GPP in the discussion. As the auxiliary information per se is only used to inform the network side of the preference of the UE for the power saving or performance, instead of commanding the network side to necessarily adjust the wireless parameter according to the preference of the UE. Therefore, after the UE reports the auxiliary information, the network side does not want to re-adjust the parameter for the UE possibly due to a heavy load or possibly since the network side considers that the current wireless parameter of the UE may satisfy the preference of the UE based on the algorithm thereof. For this case, two coping modes at the network side currently discussed in the 3GPP are: the network side not feeding back any message to the UE; or the network side feeding back a "rejection" indication to the UE.

Obviously, the first mode easily results in the UE erroneously considering that the network side does not receive the auxiliary information transmitted by itself, thereby continuously retransmitting the auxiliary information, which results in excessive additional overheads; and the second mode will generate additional downlink signaling, but can make the UE know the decision at the network side.

However, the second mode also has other defects. After the UE receives a simple rejection indication fed back by the network side, it fails to know why the network rejects the information, and thereby the UE can not know whether it can continue to transmit its auxiliary information after the rejection, or whether it will bring negative effects to the network side if the auxiliary information continues to be transmitted.

SUMMARY

The present document provides a method, apparatus and system for rejecting auxiliary information about user equipment, which solves the problem that the additional overheads are generated due to retransmission of the auxiliary information by the UE or the UE fails to know the rejection reason of the network side.

In order to solve the above technical problems, the following technical schemes are used:

A method for rejecting auxiliary information about user equipment, comprising:

a network side receiving auxiliary information reported by the user equipment; and if the network side determines not to reconfigure a wireless parameter for the user equipment, the network side transmitting rejection reason information to the user equipment.

Alternatively, the network side transmits the rejection reason to the user equipment using any of the following modes:

transmitting the rejection reason through Radio Resource Control (RRC) signaling, transmitting the rejection reason through Media Access Control (MAC) signaling, and transmitting the rejection reason through Physical Downlink Control Channel (PDCCH) signaling.

Alternatively, the rejection reason information carries a reason why the network side rejects to reconfigure the wireless parameter for the user equipment, and the reason why the network side rejects to reconfigure the wireless parameter for the user equipment specifically comprises:

the network side being heavily loaded; or the network side being overloaded; or a current wireless parameter configuration of the user equipment being matched with the auxiliary information reported by the user equipment and there being no need of reconfiguring the wireless parameter of the user equipment; or the current wireless parameter configuration having reached an adjustable limit, and failing to meet requirements of the auxiliary information reported by the user equipment.

Alternatively, the method for rejecting auxiliary information about user equipment further comprises:

the network side transmitting a rejection indication along with the rejection reason information to the user equipment while transmitting the rejection reason information to the user equipment.

A method for rejecting auxiliary information about user equipment, comprising:

a user equipment transmitting auxiliary information to a network side; and if the user equipment has not received a feedback from the network side within a first preset time length after transmitting the auxiliary information or the user equipment receives rejection reason information transmitted by the network side within the first preset time length after transmitting the auxiliary information, the user equipment considering that the network side rejects the auxiliary information of the user equipment.

Alternatively, the method for rejecting auxiliary information about user equipment further comprises:

the network side configuring the first preset time length for the user equipment, or the network side appointing the first preset time length with the user equipment in advance.

Alternatively, the network side configuring the first preset time length for the user equipment specifically comprises:

the network side configuring the first preset time length for the user equipment through a system message or RRC signaling.

Alternatively, the user equipment receives rejection reason information transmitted by the network side within the first preset time length after transmitting the auxiliary information using any of the following modes:

receiving the rejection reason information through RRC signaling, receiving the rejection reason information through MAC signaling, and receiving the rejection reason information through PDCCH signaling.

Alternatively, the rejection reason information carries a reason why the network side rejects to reconfigure the wireless parameter for the user equipment, and the reason why the network side rejects to reconfigure the wireless parameter for the user equipment specifically comprises:

the network side being heavily loaded; or the network side being overloaded; or a current wireless parameter configuration of the user equipment being matched with the auxiliary information reported by the user equipment and there being no need of reconfiguring the wireless parameter of the user equipment; or the current wireless parameter configuration having reached an adjustable limit, and failing to meet requirements of the auxiliary information reported by the user equipment.

Alternatively, after the step of the user equipment considering that the network side rejects the auxiliary information of the user equipment, the method further comprises:

after the user equipment considers that the network side rejects the auxiliary information of the user equipment, confirming whether to continue to transmit the auxiliary information.

Alternatively, confirming whether to continue to transmit the auxiliary information comprises:

if the user equipment receives the rejection reason information and the rejection reason is the network side being heavily loaded or the network side being overloaded, the user equipment limiting a transmission frequency of the auxiliary information; and if the user equipment receives the rejection reason information and the rejection reason is a current wireless parameter configuration of the user equipment being matched with the auxiliary information reported by the user equipment and there being no need of reconfiguring the wireless parameter, or the rejection reason is the current wireless parameter configuration having reached an adjustable limit and failing to meet requirements of the auxiliary information reported by the user equipment, when the user equipment triggers new auxiliary information, if the newly triggered auxiliary information is the same as the auxiliary information transmitted last time, the user equipment not transmitting the newly triggered auxiliary information.

An apparatus for rejecting auxiliary information about user equipment, comprising:

an auxiliary information reception module, configured to receive auxiliary information reported by the user equipment; and a configuration module, configured to transmit rejection reason information to the user equipment when it is determined not to reconfigure a wireless parameter for the user equipment.

Alternatively, the configuration module is specifically configured to transmit the rejection reason information through RRC signaling or MAC signaling or PDCCH signaling to the user equipment.

Alternatively, the rejection reason information carries a reason why the network side rejects to reconfigure the wireless parameter for the user equipment, and the reason why the network side rejects to reconfigure the wireless parameter for the user equipment specifically comprises:

the network side being heavily loaded; or the network side being overloaded; or a current wireless parameter configuration of the user equipment being matched with the auxiliary information reported by the user equipment and there being no need of reconfiguring the wireless parameter of the user equipment; or the current wireless parameter configuration having reached an adjustable limit, and failing to meet requirements of the auxiliary information reported by the user equipment.

Alternatively, the configuration module is further configured to transmit a rejection indication along with the rejection reason information to the user equipment while transmitting the rejection reason information to the user equipment.

The present document further provides an apparatus for rejecting auxiliary information about user equipment, comprising:

an auxiliary information transmission module, configured to transmit auxiliary information of the user equipment to a network side; and a judgment module, configured to consider that the network side rejects the auxiliary information if the auxiliary information transmission module has not received a feedback from the network side within a first preset time length after transmitting the auxiliary information or the auxiliary information transmission module receives rejection reason information transmitted by the network side within the first preset time length after transmitting the auxiliary information.

Alternatively, the apparatus for rejecting auxiliary information about user equipment further comprises:

a time configuration module, configured to accept the first preset time length configured by the network side, and accept the first preset time length configured by the network side through a system message or RRC signaling, or appoint the first preset time length with the network side in advance.

Alternatively, the rejection reason information carries a reason why the network side rejects to reconfigure the wireless parameter for the user equipment, and the reason of rejecting to reconfigure the wireless parameter for the user equipment specifically comprises:

the network side being heavily loaded; or the network side being overloaded; or a current wireless parameter configuration of the user equipment being matched with the auxiliary information reported by the user equipment and there being no need of reconfiguring the wireless parameter of the user equipment; or the current wireless parameter configuration having reached an adjustable limit, and failing to meet requirements of the auxiliary information reported by the user equipment.

Alternatively, the apparatus for rejecting auxiliary information about user equipment further comprises:

an auxiliary information control module, configured to confirm whether to continue to transmit the auxiliary information after the judgment module considers that the network side rejects the auxiliary information.

Alternatively, the auxiliary information control module comprises:

a first control unit, configured to limit a transmission frequency of the auxiliary information when the rejection reason information is received and the rejection reason is the network side being heavily loaded or the network side being overloaded; and a second control unit, configured to, when the rejection reason information is received and the rejection reason is a current wireless parameter configuration of the user equipment being matched with the auxiliary information reported by the user equipment and there being no need of reconfiguring the wireless parameter, or the rejection reason is the current wireless parameter configuration having reached an adjustable limit and failing to meet requirements of the auxiliary information reported by the user equipment, if new auxiliary information is triggered and the newly triggered auxiliary information is the same as the auxiliary information transmitted last time, not transmit the newly triggered auxiliary information.

A system for rejecting auxiliary information about user equipment, comprises a user equipment and a network side access network element, wherein, the network side access network element is configured to receive auxiliary information reported by the user equipment, and transmit rejection reason information to the user equipment when it is determined not to reconfigure a wireless parameter for the user equipment; and the user equipment is configured to transmit auxiliary information to the network side access network element, and consider that the network side access network element rejects the auxiliary information of the user equipment when the user equipment has not received a feedback from the network side access network element within a first preset time length after transmitting the auxiliary information or the user equipment receives rejection reason information transmitted by the network side access network element within the first preset time length after transmitting the auxiliary information.

Alternatively, the network side access network element is further configured to configure the first preset time length for the user equipment through a system message or RRC signaling or appoint the first preset time length with the user equipment in advance, Alternatively, the network side access network element transmits the rejection reason to the user equipment using any of the following modes:

transmitting the rejection reason through RRC signaling, transmitting the rejection reason through MAC signaling, and transmitting the rejection reason through PDCCH signaling.

Alternatively, the network side access network element is further configured to transmit a rejection indication along with the rejection reason information to the user equipment while transmitting the rejection reason information to the user equipment.

Alternatively, the rejection reason information carries a reason why the network side access network element rejects to reconfigure the wireless parameter for the user equipment, and the reason why the network side access network element rejects to reconfigure the wireless parameter for the user equipment specifically comprises:

the network side being heavily loaded; or the network side being overloaded; or a current wireless parameter configuration of the user equipment being matched with the auxiliary information reported by the user equipment and there being no need of reconfiguring the wireless parameter of the user equipment; or the current wireless parameter configuration having reached an adjustable limit, and failing to meet requirements of the auxiliary information reported by the user equipment.

Alternatively, the user equipment is further configured to confirm whether to continue to transmit the auxiliary information after considering that the network side access network element rejects the auxiliary information of the user equipment, which is specifically limiting a transmission frequency of the auxiliary information if the user equipment receives the rejection reason information and the rejection reason is the network side being heavily loaded or the network side being overloaded; and, if the user equipment receives the rejection reason information and the rejection reason is a current wireless parameter configuration of the user equipment being matched with the auxiliary information reported by the user equipment and there being no need of reconfiguring the wireless parameter, or the rejection reason is the current wireless parameter configuration having reached an adjustable limit and failing to meet requirements of the auxiliary information reported by the user equipment, when the user equipment triggers new auxiliary information, and if the newly triggered auxiliary information is the same as the auxiliary information transmitted last time, not transmit the newly triggered auxiliary information.

The above technical schemes provide a method, apparatus and system for rejecting auxiliary information about user equipment. The network side receives the auxiliary information reported by the user equipment. If the network side determines not to reconfigure a wireless parameter for the user equipment, the network side transmits rejection reason information to the user equipment, and the user equipment transmits the auxiliary information to the network side, and if the user equipment does not receive the feedback from the network side within a first preset time length after transmitting the auxiliary information or the user equipment receives rejection reason information transmitted by the network side within the first preset time length after transmitting the auxiliary information, the user equipment considers that the network side rejects the auxiliary information of the user equipment, and the network side explicitly notifies the user equipment of the rejection reason. This solves the problem that the additional overheads are generated due to retransmission of the auxiliary information by the UE or the UE fails to know the rejection reason of the network side.

PREFERRED EMBODIMENTS OF THE INVENTION

After the UE reports the auxiliary information, the network side does not want to re-adjust the parameter for the UE possibly due to a heavy load or possibly since the network side considers that the current wireless parameter of the UE may satisfy the preference of the UE based on the algorithm thereof. For this case, two coping modes at the network side currently discussed in the 3GPP are: the network side not feeding back any message to the UE; or the network side feeding back a "rejection" indication to the UE.

Obviously, the first mode easily results in the UE erroneously considering that the network side does not receive the auxiliary information transmitted by itself, thereby continuously retransmitting the auxiliary information, which result in excessive additional overheads; and the second mode will generate additional downlink signaling, but can make the UE know the decision at the network side.

However, the second mode also has other defects. After the UE receives a simple rejection indication fed back by the network side, it fails to know why the network rejects the information, and thereby the UE can not know whether it can continue to transmit its auxiliary information after the rejection, or whether it will bring negative effects to the network side if the auxiliary information continues to be transmitted.

In order to solve the above problem, the embodiments of the present document provide a method, apparatus and system for rejecting auxiliary information about user equipment. The embodiments of the present document will be described in detail hereinafter in conjunction with accompanying drawings. It should be illustrated that, in the case of no conflict, the embodiments of this application and the features in the embodiments could be combined randomly with each other.

Firstly, embodiment one of the present document will be described in conjunction with accompanying drawings.

The embodiments of the present document will be described by specifically taking an LTE system as an application environment, a UE as a user equipment, an access network element such as a base station (eNB, eNodeB) at the network side as a network side.

Figure 1:
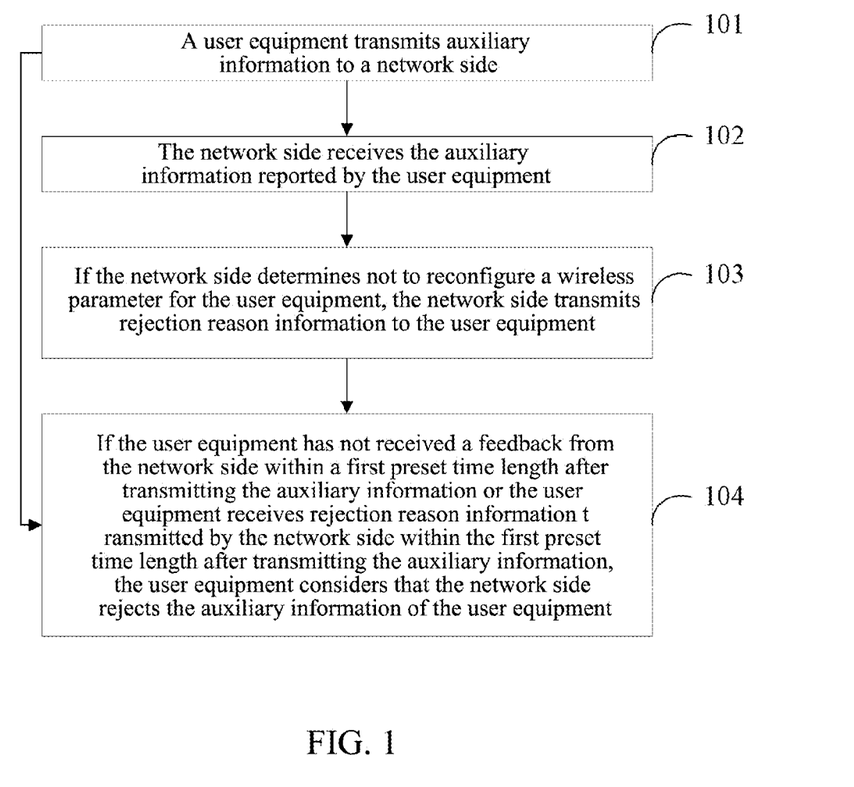
FIG. 1 is a flowchart of a method for rejecting auxiliary information about user equipment according to embodiment one of the present document.

The embodiment of the present document provides a method for rejecting auxiliary information about user equipment. A flow of a network side rejecting auxiliary information about user equipment with this method is as shown in FIG. 1, which comprises the following steps.

In step 101, a user equipment transmits auxiliary information to a network side; and in step 102, the network side receives the auxiliary information reported by the user equipment.

In this step, after the eNB receives the auxiliary information reported by the UE, the eNB judges whether it is possible to respond to the requirements of the UE according to its own conditions.

For example,

If the downlink service channel of the eNB is overloaded at this time, it needs to issue additional reconfiguration signaling to the UE if a wireless parameter is reconfigured for the UE, which will result in additional service channel overheads, and further aggravates the load. Therefore, the eNB may select to reject the requirements of the UE.

For another example,

If the auxiliary information reported by the UE requires higher transmission performance, but the loads of the uplink and downlink service channels of the eNB are heavy at this time, if the requirements of the UE are met, it will aggravate the loads, which may result in overload or influence the transmission performance of other UEs. At this time, the eNB may select to reject the requirements of the UE.

For another example,

If the auxiliary information reported by the UE requires lower power consumption but the wireless parameter (for example, a Discontinuous Reception (DRX) parameter) configured by the eNB for the UE at this time is a configuration with very low power consumption, the eNB may select to reject the requirements of the UE at this time.

As different rejection reasons will enable the UE to generate different results when judging whether to retransmit the auxiliary information or continue to transmit new auxiliary information, if the eNB decides to reject to reconfigure the wireless parameter for the UE according to the auxiliary information of the UE, the eNB may transmit the specific rejection reasons to the UE.

In step 103, if the network side determines not to reconfigure a wireless parameter for the user equipment, the network side transmits rejection reason information to the user equipment.

In this step, according to the results of the eNB judging whether it is possible to respond to the requirements of the UE according to its own conditions in step 102, and the rejection reasons carried in the rejection reason information transmitted by the eNB may comprise the following several forms.

1. The network side being heavily loaded:

it illustrates that spare uplink and downlink resources at the network side are few, and if the wireless parameter is reconfigured for the UE, the load of the air interface will be aggravated;

2. The network side being overloaded:

it illustrates that there is no remaining wireless resource at the air interface, and it is difficult to reconfigure the wireless parameter for the UE;

3. A current wireless parameter configuration of the UE being matched with the auxiliary information reported by the UE and there being no need of reconfiguring the wireless parameter:

it illustrates that the current wireless parameter of the UE can meet the requirements of the UE, and there is no need of reconfiguring the wireless parameter;

4. The current wireless parameter configuration having reached an adjustable limit, and failing to meet the requirements of the auxiliary information reported by the UE:

it illustrates that the adjustment of the wireless parameter has reached an upper limit or a lower limit.

The specific implementation method may use the following manner.

The network side and the UE may predefine Indexes of the above several reasons in a standard appointed manner, as shown in table 1.

TABLE 1

| Indexes | Rejection reasons |
| --- | --- |
| 0 | the network side being heavily loaded |
| 1 | the network side being overloaded |
| 2 | a current wireless parameter configuration of the UE being matched with the auxiliary information reported by the UE and there being no need of reconfiguring the wireless parameter |
| 3 | the current wireless parameter configuration having reached an adjustable limit, and failing to meet the requirements of the auxiliary information reported by the UE |

When the eNB is to transmit a rejection reason, it only needs to transmit an index corresponding to the rejection reason to the UE.

In addition, when the network side decides to reject the UE, it may also transmit a rejection indication to the UE. The rejection indication specifically is a simple rejection identity, i.e., a Boolean value identity, which can only express two meanings of rejection/non-rejection.

Alternatively, the above rejection reasons of the embodiments of the present document may be transmitted to the UE together with the above rejection indications; or the rejection indications may not be transmitted and only the rejection reasons are transmitted, which sufficiently include the meaning of the rejection.

The rejection reason information may be transmitted by the eNB to the UE through RRC signaling, MAC signaling, or PDCCH control signaling;

For example:

1. Through the RRC signaling:

The rejection reason of the auxiliary information about the UE may be carried by newly adding an IE in the existing RRC signaling or by defining new RRC signaling.

This will be described below by newly adding an IE in the existing RRC signaling as an example:

The rejection reasons of the auxiliary information about the UE may be carried by newly adding an IE in the RRCConnectionSetup, SecurityModeCommand, RRCConnectionReconfiguration, RRCConnectionReestablishment, RRCConnectionReestablishmentReject, RRCConnectionReject, RRCConnectionRelease, UECapabilityEnquiry, or UEInformationRequest.

Figure 2:
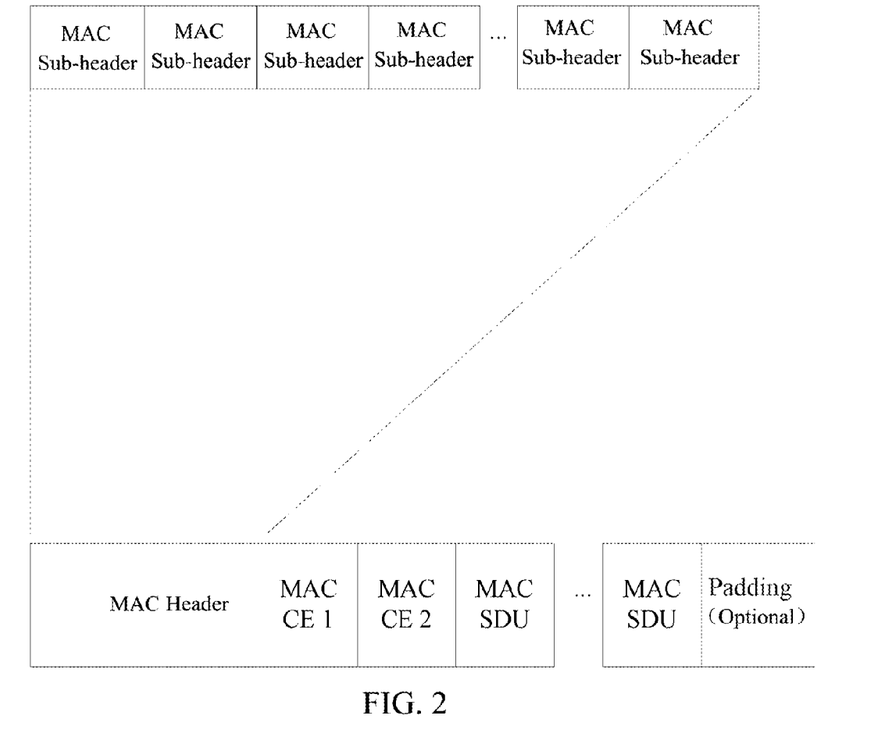
FIG. 2 is a diagram of an MAC PDU defined in the LTE MAC layer protocol standard.

2. Through the MAC signaling:

The MAC PDU defined in the LTE AMC layer protocol standard is as shown in FIG. 2:

the MAC PDU is comprised of an MAC header, MAC CEs, and MAC SDUs, wherein, the MAC SDU is used to carry data or signaling, and one MAC PDU may comprise 0 or more MAC SDUs (i.e., when an empty data package is transmitted, there may be no MAC SDU in the MAC PDU, and only the MAC header and the MAC CE are comprised); the MAC CE is used to transfer some control information related to the wireless resource management (for example, in the related art, there is an MAC CE for indicating data amount in the buffer of the UE, there is an MAC CE for indicating power margin of the UE, and so on), the MAC header is comprised of multiple MAC sub-headers, and each MAC sub-header corresponds to MAC CE and the MAC SDU one-by-one, for indicating information such as names (an LCID field in the MAC sub-header is used to represent the names of the corresponding MAC CE and MAC SDU), lengths (an L field in the MAC sub-header is used to represent lengths of the corresponding MAC CE and MAC SDU) etc. of the corresponding MAC CE and MAC SDU.

Figure 3A:
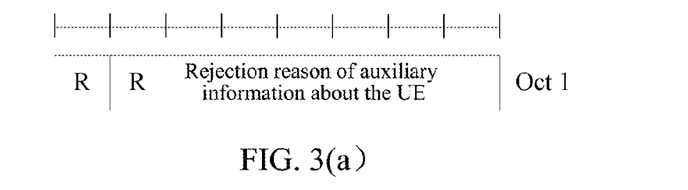
FIG. 3(a) is a diagram of an MAC CE defined by embodiment one of the present document.
Figure 3B:
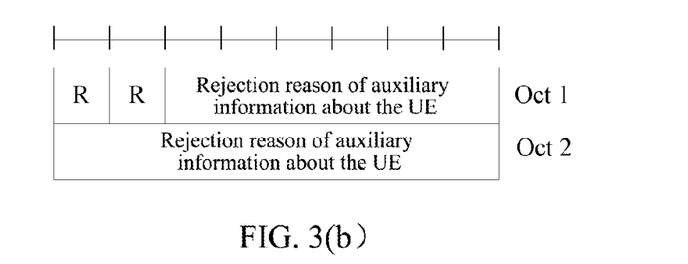
FIG. 3(b) is a diagram of another MAC CE defined by embodiment one of the present document.

The method for defining a new MAC CE to carry the rejection reasons of the auxiliary information about the UE is as follows.

As shown in FIG. 3,

"R" in the figure represents a reserved bit; if the rejection reason of the auxiliary information about the UE is less than one byte, the definition method in FIG. 3(a) may be used; and if the rejection reason of the auxiliary information about the UE is larger than one byte and less than two bytes, the definition method in FIG. 3(b) may be used. The above is described by way of example. If the rejection reason of the auxiliary information about the UE is larger than two bytes, it only needs to increase the defined number of bytes by a similar definition method.

A method for defining an LCID corresponding to the MAC CE of the rejection reason of the auxiliary information is as follows.

The definition of the downlink LCID defined by the existing LTEMAC layer protocol is as shown in the following table 2.

TABLE 2

An LCID table of a downlink shared channel

| Indexes | LCID values |
|---|---|
| 00000 | Common control channel |
| 00001-01010 | Logic channel ID |
| 01011-11010 | Reserved Indexes |
| 11011 | Activation/deactivation indication |
| 11100 | UE contention resolution identity |
| 11101 | Time advance command |
| 11110 | Discontinuous Reception (DRX) command |
| 11111 | Padding information |

The method for newly defining an LCID corresponding to the MAC CE of the rejection reason of the auxiliary information is as shown in the following table 3.

TABLE 3

An LCID table of a downlink shared channel

| Indexes | LCID values |
|---|---|
| 00000 | Common control channel |
| 00001-01010 | Logic channel ID |
| 01011-11001 | Reserved Indexes |
| 11010 | Rejection reason of the auxiliary information about the UE |
| 11011 | Activation/deactivation indication |
| 11100 | UE contention resolution identity |
| 11101 | Time advance command |
| 11110 | Discontinuous Reception (DRX) command |
| 11111 | Padding information |

In table 3, an index in the reserved Indexes is set aside to define the rejection reason of the auxiliary information about the UE. After the receiving end reads the LCID, it knows that there is the MAC CE of the rejection reason of the auxiliary information about the UE in the corresponding MAC PDU, and then it can read the rejection reason of the auxiliary information about the UE in the MAC CE.

3. Through the PDCCH control signaling:

In the LTE system, the eNB can transmit the rejection reasons of the auxiliary information about the UE to the UE through the PDCCH, and the specific implementation comprises:

selecting one of the existing PDCCH formats, and carrying the rejection reasons of auxiliary information about the UE by adding a field therein;

newly defining a PDCCH format, for transmitting the rejection reasons of the auxiliary information about the UE;

For example:

there are many PDCCH formats in the existing LTE system, which are respectively used to indicate downlink resource assignment or uplink resource scheduling of the UE. This will be described below by taking adding the rejection reasons of auxiliary information about the UE in the PDCCH format 1 as an example:

The PDCCH format 1 in which the rejection reasons of the auxiliary information about the UE are added is as follows:

Fields
Carrier indicator
Resource allocation header
Resource block assignment
Modulation and coding scheme
HARQ process number
New data indicator
Redundancy version
TPC command for PUCCH
Downlink Assignment Index
Rejection reasons of auxiliary information about the UE Wherein, the rejection reasons of auxiliary information about the UE are added at the end of the PDCCH format 1 in the existing LTE standard, and the length of the field thereof is determined according to the defined granularity thereof. If the above four indexes are used as an example, the length may be 2 bytes.

Similarly, the rejection reasons of auxiliary information about the UE may be added in other PDCCH formats in the existing LTE standard, and the manner thereof is similar to that in the above example.

A PDCCH format may be newly defined, for example, a PDCCH format 5 is defined, which is dedicated to carrying the rejection reasons of auxiliary information about the UE.

In step 104, if the user equipment has not received a feedback from the network side within a first preset time length after transmitting the auxiliary information or the user equipment receives rejection reason information transmitted by the network side within the first preset time length after transmitting the auxiliary information, the user equipment considers that the network side rejects the auxiliary information of the user equipment.

After the UE transmits the auxiliary information to the network side, there are two basic scenarios.

In scenario one, the eNB does not feed back any response to the UE.

The disadvantage thereof is that:

the UE does not know whether the auxiliary information is received by the eNB correctly; even if it is assumed that the eNB receives the auxiliary information correctly, the UE does not know the reason why the eNB does not make a response; and therefore, the UE may possibly retransmit the auxiliary information transmitted last time, which will result in redundant overheads of the system.

Therefore, for this scenario, it is necessary to define a judgment rule of the UE.

That is,

If the UE does not receive any feedback from the network side within a first preset time length after transmitting the auxiliary information, the UE considers that the network side rejects the auxiliary information of the UE; and the UE should not retransmit the auxiliary information which has been transmitted.

The first preset time length may be configured for the UE by the network side through a system message or RRC signaling or is appointed by the network side with the UE in advance;

The unit of the first preset time length may be milliseconds, seconds, minutes, or a larger unit of time.

The examples of the transmission modes thereof are as follows.

1. If the eNB configures a first preset time length for the UE through a system message, as the system message is a broadcast message, the same first preset time length can be configured uniformly for all UEs of a cell.

For example, a new IE may be added in a SystemInformationBlock2 (SIB2) to carry the first preset time length:

The following contents are added in the SIB2:

```
SystemInformationBlockType2 ::= SEQUENCE {
  ac-BarringInfo    SEQUENCE {
  ac-BarringForEmergency  BOOLEAN,
  ac-BarringForMO-Signalling AC-BarringConfig  OPTIONAL,
  -- Need OP
  ac-BarringForMO-Data AC-BarringConfig OPTIONAL-- Need OP
  }      OPTIONAL,-- Need OP
  radioResourceConfigCommon RadioResourceConfigCommonSIB,
  ue-TimersAndConstants UE-TimersAndConstants,
  freqInfo   SEQUENCE {
  ul-CarrierFreq  ARFCN-ValueEUTRA OPTIONAL,-- Need OP
  ul-Bandwidth  ENUMERATED {n6, n15, n25, n50, n75, n100}
         OPTIONAL,-- Need OP
  additionalSpectrumEmission AdditionalSpectrumEmission
  },
  mbsfn-SubframeConfigList MBSFN-SubframeConfigList
  OPTIONAL, -- Need OR
  timeAlignmentTimerCommon TimeAlignmentTimer,
  ...,
  lateNonCriticalExtension OCTET STRING  OPTIONAL,-- Need OP
  [[ ssac-BarringForMMTEL-Voice-r9 AC-BarringConfig
  OPTIONAL,-- Need OP
  ssac-BarringForMMTEL-Video-r9 AC-BarringConfig OPTIONAL--
  Need OP
  ]],
  [[ ac-BarringForCSFB-r10 AC-BarringConfig OPTIONAL-- Need
  OP
  ]]
     ue-AssistantInfoRejection             UE-
  AssistantInfoRejection-IE OPTIONAL-- Need OP
  }
     UE-AssistantInfoRejection-IE ::= SEQUENCE {
  Threshold-1  ENUMERATED {
    s00, s10, s20, s40,
    s60, s80, s100,s200,s400,s800},
}
```

The above description is an example of adding a first preset time length in a pseudocode of SIB2 in the existing LTE protocol, i.e., newly adding one IE ue-AssistantInfoRejection for carrying the first preset time length in the SIB2. The above s00, s10, and s20 represent 0 second, 10 seconds, 20 seconds respectively, and so on.

In addition to adding the IE in the existing SIB, a new SIB may also be defined, for example, SIB15 is defined for carrying the first preset time length.

2. If the eNB configures the first preset time length for the UE through the RRC signaling:

The first preset time length may be transmitted to the UE with reference to the above example of transmitting a rejection reason to the UE through the RRC signaling, for example, RRCConnectionReconfiguration, or may be transmitted using other downlink RRC signaling.

Scenario 2: the eNB feeds back a response to the UE, for example, feeding back a new wireless parameter configuration, or feeding back rejection reason information according to the embodiments of the present document.

For the scenario, the following rule may be defined:

if the UE receives the rejection reason transmitted by the network side within a first preset time length, the UE considers that the network side rejects the auxiliary information about the UE;

As there are many rejection reasons, after the UE receives different rejection reasons, it is judged whether subsequent auxiliary information can continue to be transmitted:

1. If the UE receives a rejection reason, and the rejection reason is the network side being heavily loaded or the network side being overloaded, the UE should limit the transmission frequency of the auxiliary information;

With respect to how to limit the transmission frequency of the auxiliary information, it does not belong to the technical scope of the present document. As a simple example here, the UE per se can define a counter to count the number of times for transmitting the auxiliary information in unit time, and limit the number.

2. If the UE receives a rejection reason, and the rejection reason is a current wireless parameter configuration of the UE being matched with the auxiliary information reported by the UE and there being no need of reconfiguring the wireless parameter or the current wireless parameter configuration having reached an adjustable limit, and failing to meet the requirements of the auxiliary information reported by the UE, when the UE triggers new auxiliary information, if the newly triggered auxiliary information is the same as the auxiliary information transmitted last time, the UE does not transmit the newly triggered auxiliary information.

This is because that the eNB considers that since it is unnecessary to adjust the wireless parameter for the previous auxiliary information, it is redundant to transmit the same auxiliary information again.

Embodiment two of the present document will be described below in conjunction with accompanying drawings.

Figure 4:
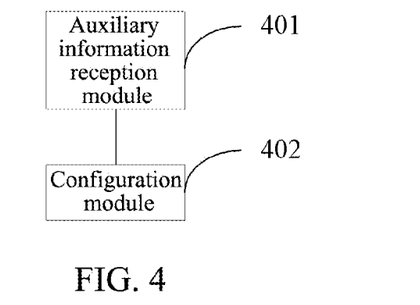
FIG. 4 is a structural diagram of an apparatus for rejecting auxiliary information about user equipment according to embodiment two of the present document

The embodiment of the present document provides an apparatus for rejecting auxiliary information about user equipment, of which a structure is shown in FIG. 4, comprising an auxiliary information reception module 401 and a configuration module 402, wherein, the auxiliary information reception module 401 is configured to receive auxiliary information reported by the user equipment; and the configuration module 402 is configured to transmit rejection reason information to the user equipment when it is determined not to reconfigure a wireless parameter for the user equipment.

Alternatively, the configuration module 402 is configured to transmit the rejection reason information through RRC signaling or MAC signaling or PDCCH signaling to the user equipment.

Alternatively, the rejection reason information carries a reason why the network side rejects to reconfigure the wireless parameter for the user equipment, the reason why the network side rejects to reconfigure the wireless parameter for the user equipment comprises:

the network side being heavily loaded; or the network side being overloaded; or a current wireless parameter configuration of the user equipment being matched with the auxiliary information reported by the user equipment and there being no need of reconfiguring the wireless parameter of the user equipment; or the current wireless parameter configuration having reached an adjustable limit, and failing to meet the requirements of the auxiliary information reported by the user equipment.

Alternatively, the configuration module 402 is further configured to transmit a rejection indication along with the rejection reason information to the user equipment while transmitting the rejection reason information to the user equipment.

The apparatus for rejecting auxiliary information about user equipment according to the embodiment of the present document may be integrated into a network side access network element, and corresponding functions are completed by the network side access network element; the user equipment is specifically a UE.

Embodiment three of the present document will be described below in conjunction with accompanying drawings.

Figure 5:
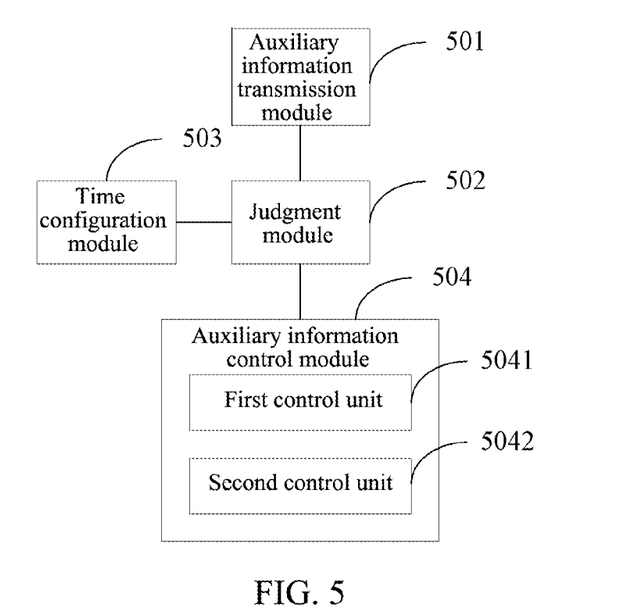
FIG. 5 is a structural diagram of an apparatus for rejecting auxiliary information about user equipment according to embodiment three of the present document.

The embodiment of the present document provides an apparatus for rejecting auxiliary information about user equipment, of which a structure is shown in FIG. 5, comprising an auxiliary information transmission module 501 and a judgment module 502, wherein, the auxiliary information transmission module 501 is configured to transmit auxiliary information of the user equipment to a network side; and the judgment module 502 is configured to consider that the network side rejects the auxiliary information if the auxiliary information transmission module 501 has not received a feedback from the network side within a first preset time length after transmitting the auxiliary information or the auxiliary information transmission module 501 receives rejection reason information transmitted by the network side within the first preset time length after transmitting the auxiliary information.

Alternatively, said apparatus for rejecting auxiliary information about user equipment further comprises a time configuration module 503, wherein, the time configuration module 503 is configured to accept the first preset time length configured by the network side, which specifically comprises accepting the first preset time length configured by the network side through a system message or RRC signaling, or appoint the first preset time length with the network side in advance.

Alternatively, the rejection reason information carries a reason why the network side rejects to reconfigure the wireless parameter for the user equipment, the reason why the network side rejects to reconfigure the wireless parameter for the user equipment specifically comprises:

the network side being heavily loaded; or the network side being overloaded; or a current wireless parameter configuration of the user equipment being matched with the auxiliary information reported by the user equipment and there being no need of reconfiguring the wireless parameter of the user equipment; or the current wireless parameter configuration having reached an adjustable limit, and failing to meet the requirements of the auxiliary information reported by the user equipment.

Alternatively, said apparatus for rejecting auxiliary information about user equipment further comprises an auxiliary information control module 504, wherein, the auxiliary information control module 504 is configured to confirm whether to continue to transmit the auxiliary information after the judgment module 502 considers that the network side rejects the auxiliary information.

Alternatively, the auxiliary information control module 504 comprises a first control unit 5041 and a second control unit 5042, wherein, the first control unit 5041 is configured to limit the transmission frequency of the auxiliary information when the rejection reason information is received and the rejection reason is the network side being heavily loaded or the network side being overloaded; and the second control unit 5042 is configured to, when the rejection reason information is received and the rejection reason is a current wireless parameter configuration of the user equipment being matched with the auxiliary information reported by the user equipment and there being no need of reconfiguring the wireless parameter, or the rejection reason is the current wireless parameter configuration having reached an adjustable limit and failing to meet the requirements of the auxiliary information reported by the user equipment, if new auxiliary information is triggered and the newly triggered auxiliary information is the same as the auxiliary information transmitted last time, not transmit the newly triggered auxiliary information.

The apparatus for rejecting auxiliary information about user equipment according to the embodiment of the present document may be integrated into a UE, and corresponding functions are completed by the UE; the user equipment related in the embodiment of the present invention specifically is a UE.

Embodiment four of the present document will be described below in conjunction with accompanying drawings.

Figure 6:
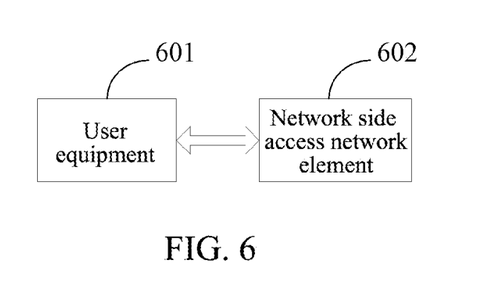
FIG. 6 is a structural diagram of a system for rejecting auxiliary information about user equipment according to embodiment four of the present document.

The embodiment of the present document provides a system for rejecting auxiliary information about user equipment, of which a structure is shown in FIG. 6, comprising a user equipment 601 and a network side access network element 602, wherein, the network side access network element 602 is configured to receive auxiliary information reported by user equipment 601, and transmit rejection reason information to the user equipment 601 when it is determined not to reconfigure a wireless parameter for the user equipment 601; and the user equipment 601 is configured to transmit auxiliary information to the network side access network element 602, and consider that the network side access network element 602 rejects the auxiliary information of the user equipment 601 when the user equipment 601 has not received a feedback from the network side access network element 602 within a first preset time length after transmitting the auxiliary information or the user equipment 601 receives rejection reason information transmitted by the network side access network element 602 within the first preset time length after transmitting the auxiliary information.

Alternatively, the network side access network element 602 is further configured to configure the first preset time length for the user equipment 601 through a system message or RRC signaling or appoint the first preset time length with the user equipment 601 in advance.

Alternatively, the network side access network element 602 transmits the rejection reason to the user equipment 601 using any of the following modes:

transmitting the rejection reason through RRC signaling, transmitting the rejection reason through MAC signaling, and transmitting the rejection reason through PDCCH signaling.

Alternatively, the network side access network element 602 is further configured to transmit a rejection indication along with the rejection reason information to the user equipment while transmitting the rejection reason information to the user equipment 601.

Alternatively, the rejection reason information carries a reason why the network side access network element 602 rejects to reconfigure the wireless parameter for the user equipment 601, the reason why the network side access network element 602 rejects to reconfigure the wireless parameter for the user equipment 601 specifically comprises:

the network side being heavily loaded; or the network side being overloaded; or a current wireless parameter configuration of the user equipment 601 being matched with the auxiliary information reported by the user equipment 601 and there being no need of reconfiguring the wireless parameter of the user equipment 601; or the current wireless parameter configuration having reached an adjustable limit, and failing to meet the requirements of the auxiliary information reported by the user equipment 601.

Alternatively, the user equipment 601 is further configured to confirm whether to continue to transmit the auxiliary information after considering that the network side access network element 602 rejects the auxiliary information of the user equipment 601. Specifically, if the user equipment 601 receives the rejection reason information and the rejection reason is the network side being heavily loaded or the network side being overloaded, the transmission frequency of the auxiliary information is limited; and if the user equipment 601 receives the rejection reason information and the rejection reason is a current wireless parameter configuration of the user equipment 601 being matched with the auxiliary information reported by the user equipment 601 and there being no need of reconfiguring the wireless parameter, or the rejection reason is the current wireless parameter configuration having reached an adjustable limit and failing to meet the requirements of the auxiliary information reported by the user equipment 601, when the user equipment 601 triggers new auxiliary information, if the newly triggered auxiliary information is the same as the auxiliary information transmitted last time, the user equipment 601 does not transmit the newly triggered auxiliary information.

The user equipment 601 according to the embodiment of the present document is specifically a UE, and the network side access network element is specifically an eNB.

The embodiments of the present document provide a method, apparatus and system for rejecting auxiliary information about user equipment. The network side receives the auxiliary information reported by the user equipment. If the network side determines not to reconfigure a wireless parameter for the user equipment, the network side transmits rejection reason information to the user equipment, and the user equipment transmits the auxiliary information to the network side, and if the user equipment does not receive the feedback from the network side within a first preset time length after transmitting the auxiliary information or the user equipment receives rejection reason information transmitted by the network side within the first preset time length after transmitting the auxiliary information, the user equipment considers that the network side rejects the auxiliary information of the user equipment, and the network side explicitly notifies the user equipment of the rejection reason. This solves the problem that the additional overheads are generated due to retransmission of the auxiliary information by the UE or the UE fails to know the rejection reason of the network side. This enables the UE to control the transmission of its own auxiliary information through a rejection mechanism, thereby avoiding impacts on the network side which influences the system efficiency. The technical schemes provided by the embodiments of the present document can also be applied to the UMTS system.

A person having ordinary skill in the art can understand that all or part of steps in the above embodiments can be implemented by computer program flow, which can be stored in a computer readable storage medium, is performed on a corresponding hardware platform (for example, a system, a device, an apparatus, and a component etc.), and when performed, comprises one of steps of the method embodiment or a combination thereof Alternatively, all or part of steps in the above embodiments can also be implemented by integrated circuits, can be respectively made into a plurality of integrated circuit modules; alternatively, it is implemented with making several modules or steps of them into a single integrated circuit module. Thus, the present document is not limited to any specific combinations of hardware and software.

Each module, functional module or functional unit in the aforementioned embodiments can be implemented with general computing apparatuses, and can be integrated in a single computing apparatus, or distributed onto a network consisting of a plurality of computing apparatuses.

When each module, functional module or functional unit in the aforementioned embodiments is implemented in a form of software functional modules and is sold or used as an independent product, it can be stored in a computer readable storage medium, which may be a read-only memory, a disk or a disc etc.

Changes or substitutions can easily be reached by a person having ordinary skill in the art within the technical scope disclosed by the present document, and should be included in the protection scope of the present document. Therefore, the protection scope of the present document is defined by the protection scope of the claims.

INDUSTRIAL APPLICABILITY

The above technical schemes provide a method, apparatus and system for rejecting auxiliary information about user equipment. The network side receives the auxiliary information reported by the user equipment. If the network side determines not to reconfigure a wireless parameter for the user equipment, the network side transmits rejection reason information to the user equipment, and the user equipment transmits the auxiliary information to the network side, and if the user equipment does not receive the feedback from the network side within a first preset time length after transmitting the auxiliary information or the user equipment receives rejection reason information transmitted by the network side within the first preset time length after transmitting the auxiliary information, the user equipment considers that the network side rejects the auxiliary information of the user equipment, and the network side explicitly notifies the user equipment of the rejection reason. This solves the problem that the additional overheads are generated due to retransmission of the auxiliary information by the UE or the UE fails to know the rejection reason of the network side. Therefore, the present document has strong industrial applicability.

What is claimed is:

1. A method for rejecting auxiliary information about user equipment, comprising:

a user equipment transmitting auxiliary information to a network side; and if the user equipment has not received a feedback from the network side within a first preset time length after transmitting the auxiliary information or the user equipment receives rejection reason information transmitted by the network side within the first preset time length after transmitting the auxiliary information, the user equipment considering that the network side rejects the auxiliary information of the user equipment;

after the user equipment considers that the network side rejects the auxiliary information of the user equipment, the user equipment confirming whether to continue to transmit the auxiliary information, comprising:

if the user equipment receives the rejection reason information and the rejection reason is the network side being heavily loaded or the network side being overloaded, the user equipment limiting a transmission frequency of the auxiliary information; and if the user equipment receives the rejection reason information and the rejection reason is a current wireless parameter configuration of the user equipment being matched with the auxiliary information reported by the user equipment and there being no need of reconfiguring the wireless parameter, or the rejection reason is the current wireless parameter configuration having reached an adjustable limit and failing to meet requirements of the auxiliary information reported by the user equipment, when the user equipment triggers new auxiliary information, if the newly triggered auxiliary information is the same as the auxiliary information transmitted last time, the user equipment not transmitting the newly triggered auxiliary information.

2. The method for rejecting auxiliary information about user equipment according to claim 1, further comprising:

the network side configuring the first preset time length for the user equipment, or the network side appointing the first preset time length with the user equipment in advance, wherein, the step of the network side configuring the first preset time length for the user equipment comprises:

the network side configuring the first preset time length for the user equipment through a system message or RRC signaling.

3. The method for rejecting auxiliary information about user equipment according to claim 1, wherein, the user equipment receives rejection reason information transmitted by the network side within the first preset time length after transmitting the auxiliary information using any of the following modes:

receiving the rejection reason information through RRC signaling, receiving the rejection reason information through MAC signaling, and receiving the rejection reason information through PDCCH signaling, or, wherein, the rejection reason information carries a reason why the network side rejects to reconfigure the wireless parameter for the user equipment, and said reason comprises:

the network side being heavily loaded; or the network side being overloaded; or a current wireless parameter configuration of the user equipment being matched with the auxiliary information reported by the user equipment and there being no need of reconfiguring the wireless parameter of the user equipment; or the current wireless parameter configuration having reached an adjustable limit, and failing to meet requirements of the auxiliary information reported by the user equipment.

4. An apparatus for rejecting auxiliary information about user equipment, comprising a processor configured to:

transmit auxiliary information of the user equipment to a network side; and consider that the network side rejects the auxiliary information if the auxiliary information transmission module has not received a feedback from the network side within a first preset time length after transmitting the auxiliary information or the auxiliary information transmission module receives rejection reason information transmitted by the network side within the first preset time length after transmitting the auxiliary information;

confirm whether to continue to transmit the auxiliary information after the judgment module considers that the network side rejects the auxiliary information by:

limiting a transmission frequency of the auxiliary information when the rejection reason information is received and the rejection reason is the network side being heavily loaded or the network side being overloaded; and when the rejection reason information is received and the rejection reason is a current wireless parameter configuration of the user equipment being matched with the auxiliary information reported by the user equipment and there being no need of reconfiguring the wireless parameter, or the rejection reason is the current wireless parameter configuration having reached an adjustable limit and failing to meet requirements of the auxiliary information reported by the user equipment, if new auxiliary information is triggered and the newly triggered auxiliary information is the same as the auxiliary information transmitted last time, not transmitting the newly triggered auxiliary information.

5. The apparatus for rejecting auxiliary information about user equipment according to claim 4, the processor is further configured to:

accept the first preset time length configured by the network side, and accept the first preset time length configured by the network side through a system message or RRC signaling, or appoint the first preset time length with the network side in advance.

6. The apparatus for rejecting auxiliary information about user equipment according to claim 4, wherein, the rejection reason information carries a reason why the network side rejects to reconfigure the wireless parameter for the user equipment, and said reason comprises:

the network side being heavily loaded; or the network side being overloaded; or a current wireless parameter configuration of the user equipment being matched with the auxiliary information reported by the user equipment and there being no need of reconfiguring the wireless parameter of the user equipment; or the current wireless parameter configuration having reached an adjustable limit, and failing to meet requirements of the auxiliary information reported by the user equipment.

7. A system for rejecting auxiliary information about user equipment, comprising a user equipment and a network side access network element, wherein, the network side access network element comprises a processor, configured to receive auxiliary information reported by user equipment, and transmit rejection reason information to the user equipment when it is determined not to reconfigure a wireless parameter for the user equipment; and the user equipment is configured to transmit auxiliary information to the network side access network element, and consider that the network side access network element rejects the auxiliary information of the user equipment when the user equipment has not received a feedback from the network side access network element within a first preset time length after transmitting the auxiliary information or the user equipment receives rejection reason information transmitted by the network side access network element within the first preset time length after transmitting the auxiliary information;

wherein, the rejection reason information carries a reason why the network side access network element rejects to reconfigure the wireless parameter for the user equipment, and said reason comprises:

the network side being heavily loaded; or the network side being overloaded; or a current wireless parameter configuration of the user equipment being matched with the auxiliary information reported by the user equipment and there being no need of reconfiguring the wireless parameter of the user equipment; or the current wireless parameter configuration having reached an adjustable limit, and failing to meet requirements of the auxiliary information reported by the user equipment;

wherein, the user equipment is further configured to confirm whether to continue to transmit the auxiliary information after considering that the network side access network element rejects the auxiliary information of the user equipment by:

limiting a transmission frequency of the auxiliary information if the user equipment receives the rejection reason information and the rejection reason is the network side being heavily loaded or the network side being overloaded; and if the user equipment receives the rejection reason information and the rejection reason is a current wireless parameter configuration of the user equipment being matched with the auxiliary information reported by the user equipment and there being no need of reconfiguring the wireless parameter, or the rejection reason is the current wireless parameter configuration having reached an adjustable limit and failing to meet requirements of the auxiliary information reported by the user equipment, when the user equipment triggers new auxiliary information, and if the newly triggered auxiliary information is the same as the auxiliary information transmitted last time, not transmitting the newly triggered auxiliary information.

8. The apparatus for rejecting auxiliary information about user equipment according to claim 7, wherein, the processor of the network side access network element is further configured to configure the first preset time length for the user equipment through a system message or RRC signaling or appoint the first preset time length with the user equipment in advance, Or, Wherein, the processor of the network side access network element transmits the rejection reason to the user equipment using any of the following modes:

transmitting the rejection reason through RRC signaling, transmitting the rejection reason through MAC signaling, and transmitting the rejection reason through PDCCH signaling, Or, Wherein, the processor of the network side access network element is further configured to transmit a rejection indication along with the rejection reason information to the user equipment while transmitting the rejection reason information to the user equipment.

\* \* \* \* \*